PULSE TYPE MULTIPLEX COMMUNICATION SYSTEM

Original Filed July 17, 1943 7 Sheets-Sheet 1

INVENTOR.
CLARENCE W. HANSELL
BY Harry Tunick
ATTORNEY.

PULSE TYPE MULTIPLEX COMMUNICATION SYSTEM

Original Filed July 17, 1943 7 Sheets-Sheet 2

INVENTOR.
CLARENCE W. HANSELL.
BY Harry Tunick
ATTORNEY

PULSE TYPE MULTIPLEX COMMUNICATION SYSTEM

Original Filed July 17, 1943 7 Sheets-Sheet 3

INVENTOR.
CLARENCE W. HANSELL.
BY
ATTORNEY.

June 2, 1953 C. W. HANSELL 2,640,921

PULSE TYPE MULTIPLEX COMMUNICATION SYSTEM

Original Filed July 17, 1943 7 Sheets-Sheet 4

INVENTOR.
CLARENCE W. HANSELL.
BY Harry Tunick
ATTORNEY

June 2, 1953 C. W. HANSELL 2,640,921

PULSE TYPE MULTIPLEX COMMUNICATION SYSTEM

Original Filed July 17, 1943 7 Sheets-Sheet 5

INVENTOR.
CLARENCE W. HANSELL.
BY Harry Tunick
ATTORNEY.

June 2, 1953 C. W. HANSELL 2,640,921

PULSE TYPE MULTIPLEX COMMUNICATION SYSTEM

Original Filed July 17, 1943 7 Sheets-Sheet 6

INVENTOR.
BY CLARENCE W. HANSELL
ATTORNEY.

June 2, 1953 C. W. HANSELL 2,640,921

PULSE TYPE MULTIPLEX COMMUNICATION SYSTEM

Original Filed July 17, 1943 7 Sheets-Sheet 7

INVENTOR.
CLARENCE W. HANSELL
BY
ATTORNEY.

Patented June 2, 1953

2,640,921

UNITED STATES PATENT OFFICE 2,640,921

PULSE TYPE MULTIPLEX COMMUNICATION SYSTEM

Clarence W. Hansell, Port Jefferson, N. Y., assignor to Radio Corporation of America, a corporation of Delaware Original application July 17, 1943, Serial No. 495,181, now Patent No. 2,478,919, dated August 16, 1949. Divided and this application May 28, 1949, Serial No. 96,124

24 Claims. (Cl. 250—27)

Figure 1:
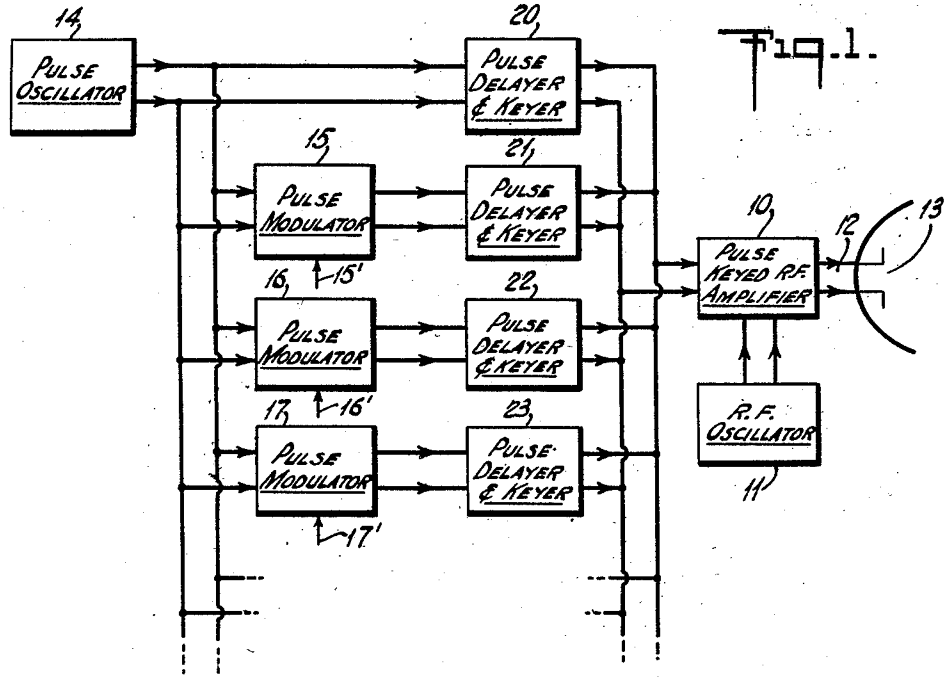

The present invention relates to communication systems employing pulses of radio frequency energy which are short compared to the time intervals between them, and particularly to a multiplex system wherein a plurality of trains or groups of pulses are transmitted, each group bearing its own modulation in accordance with the particular message to be conveyed thereby.

This application is a division of my parent application Serial No. 495,181 filed July 17, 1943 issued 16 August 1949 as U. S. Patent 2,478,919.

In my copending application, Serial No. 371,-865, filed December 27, 1940, now U. S. Patent 2,381,444 granted August 7, 1945 there is disclosed a pulse type communication system in which the receiver is rendered operative solely at time periods when the signal pulses are due to arrive. I prefer to call a receiver operated in this manner a "shuttered" or "gated" receiver.

Advantages of such a system are: (1) The peak power at the transmitter can be made to exceed considerably that which is obtainable in a continuous wave system, by virtue of the fact that the transmitter power is concentrated in the short pulses and (2) that there is obtainable an increase in the signal-to-noise power compared to continuous wave systems, not only because of the increased transmitted power but also because the receiver is responsive only during time periods which may be occupied by the transmitted pulses, thus eliminating the effect of noise and interference occurring between pulses.

In accordance with the present invention, there is provided a multiplex system wherein a multiplicity of transmitting channels are operated over a single transmitter to transmit non-overlapping pulses which are very short compared to the time intervals between them. The train or group of pulses from each transmitting station has its own modulation impressed thereon, and the pulses from all transmitting stations occupy only a small percentage of the total time for all conditions of modulation. The transmitter peak power is almost inversely proportional to the percentage of total time occupied by the pulses, and is thus high compared to known continuous wave systems. At the receiver, a synchronization system is employed to enable the different receivers or utilization circuits to be individually responsive at different times and solely at those times at which the signal pulses are due to arrive. Thresholding and limiting devices may be employed at the receiver to further reduce the noise. Thus, if there are continuous wave transmitters which might tend to interfere with the pulsing system of the invention, the output from the continuous wave transmitters must reach the receiver of the invention with greater strength to produce interference than with a continuous wave receiver. So long as the received strength of the continuous waves is less than the threshold value set at the receiver of the invention, the continuous waves will not interfere greatly with the operation of the present invention. Likewise, if the continuous waves do not modulate the signal current down to values below the limiting value they will not interfere greatly with the operation of the present invention. In general, so long as the peak amplitude of all noise and interference combined is less than half the peak amplitude of the pulse signal, a very great reduction in the effect of the combined noise and interference may be accomplished by the thresholding and limiting.

In accordance with the present invention, all pulse transmitting stations of the multiplex system will operate from a single transmitter and have the same pulse or repetition rate, although the different trains or groups of pulses from the stations will occupy separate time periods. A single receiver receives all the pulses, and by means of suitable switching or commutating circuits transfers the different trains of pulses to the different channels to render them responsive solely at times when these pulses are due to arrive.

An outstanding advantage for the pulse system of the present invention employing a "shuttered" or "gated" receiver is that great stability of radio frequencies in transmitter and receiver is not required. Therefore, the system is particularly advantageous for use at the highest radio frequencies where frequency stability provides a serious problem in continuous wave systems. The discrimination against noise and interference made possible by the pulse rate and pulse timing selectivity replaces the selectivity based upon close control of radio carrier frequencies, which is relied upon in continuous wave systems.

Figure 7:
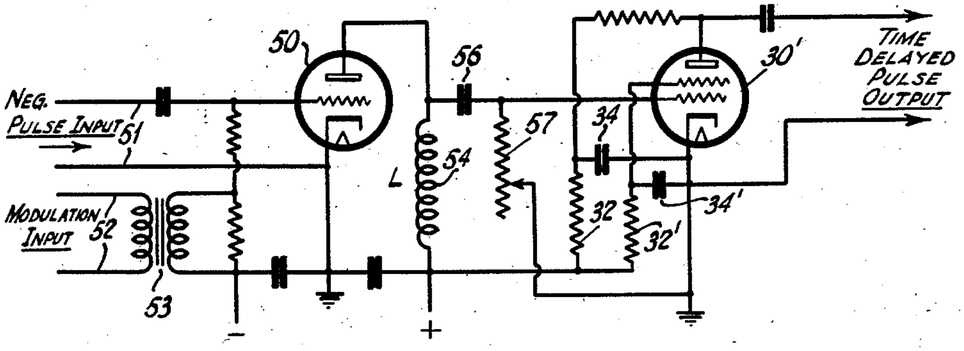
Figure 8:
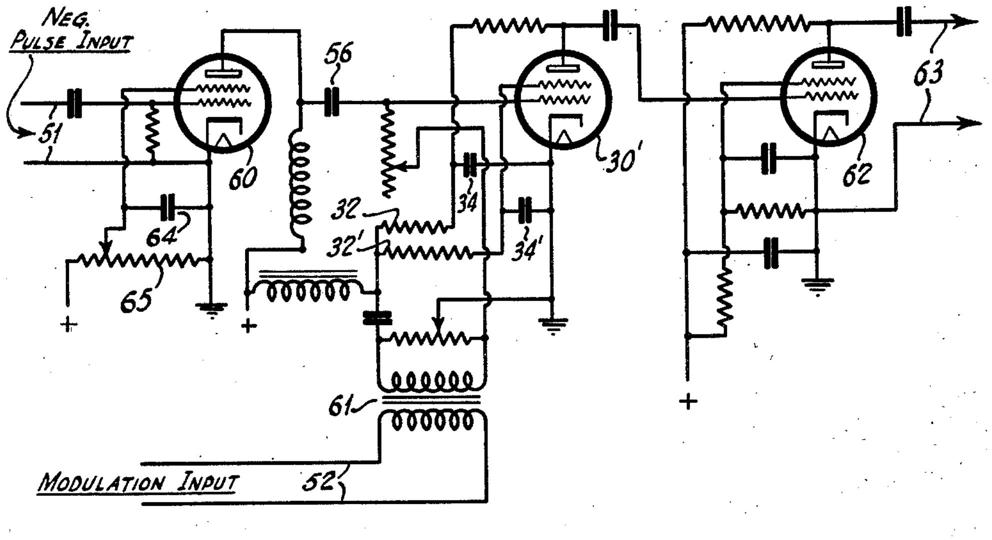
Figure 9:
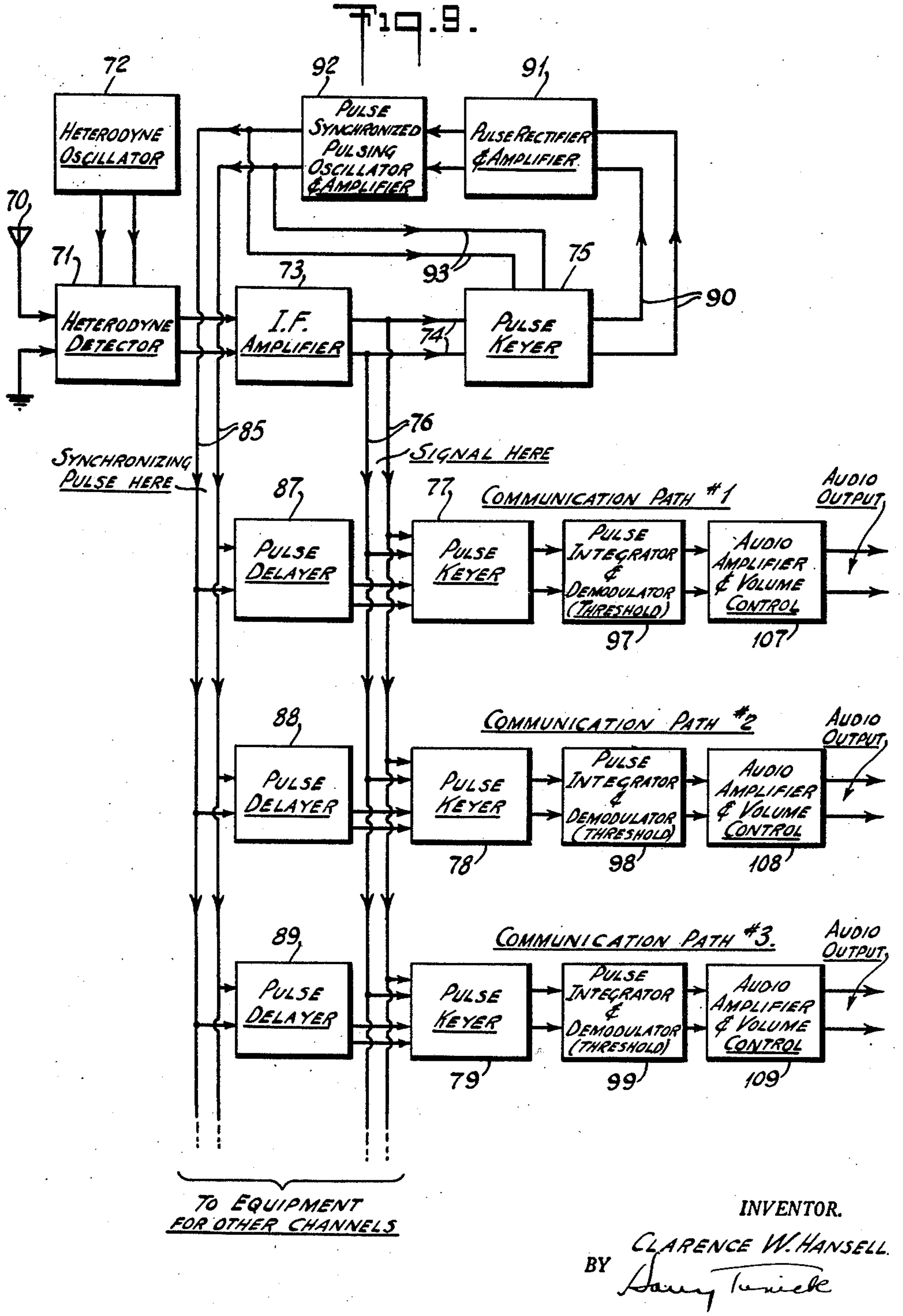
Figure 10:
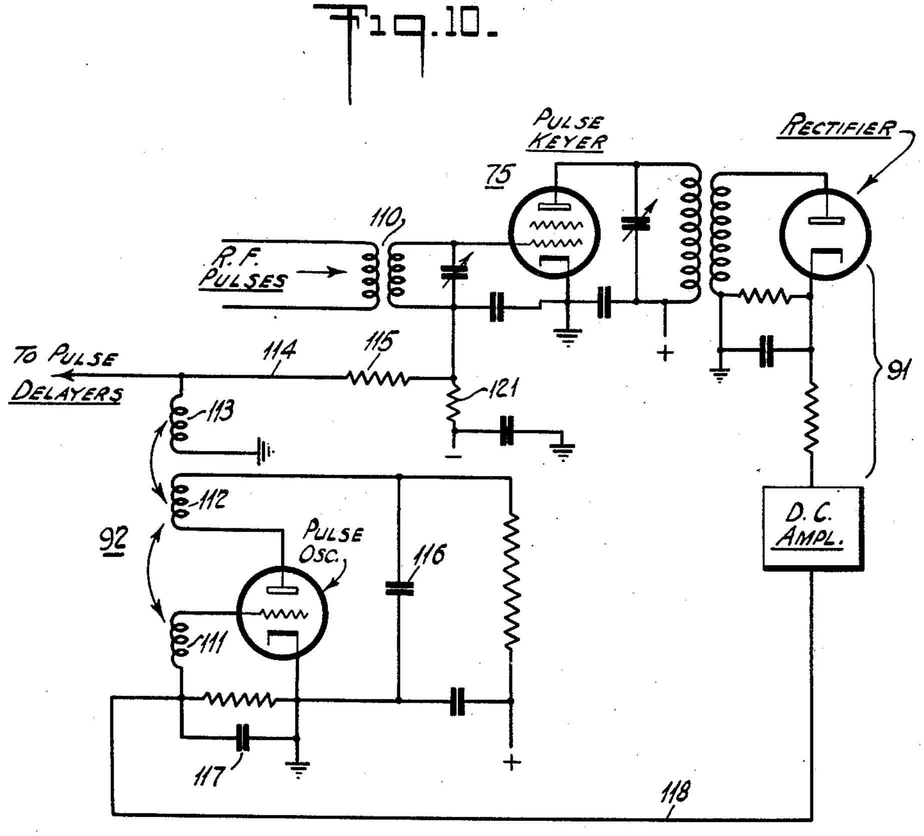
Figure 11:
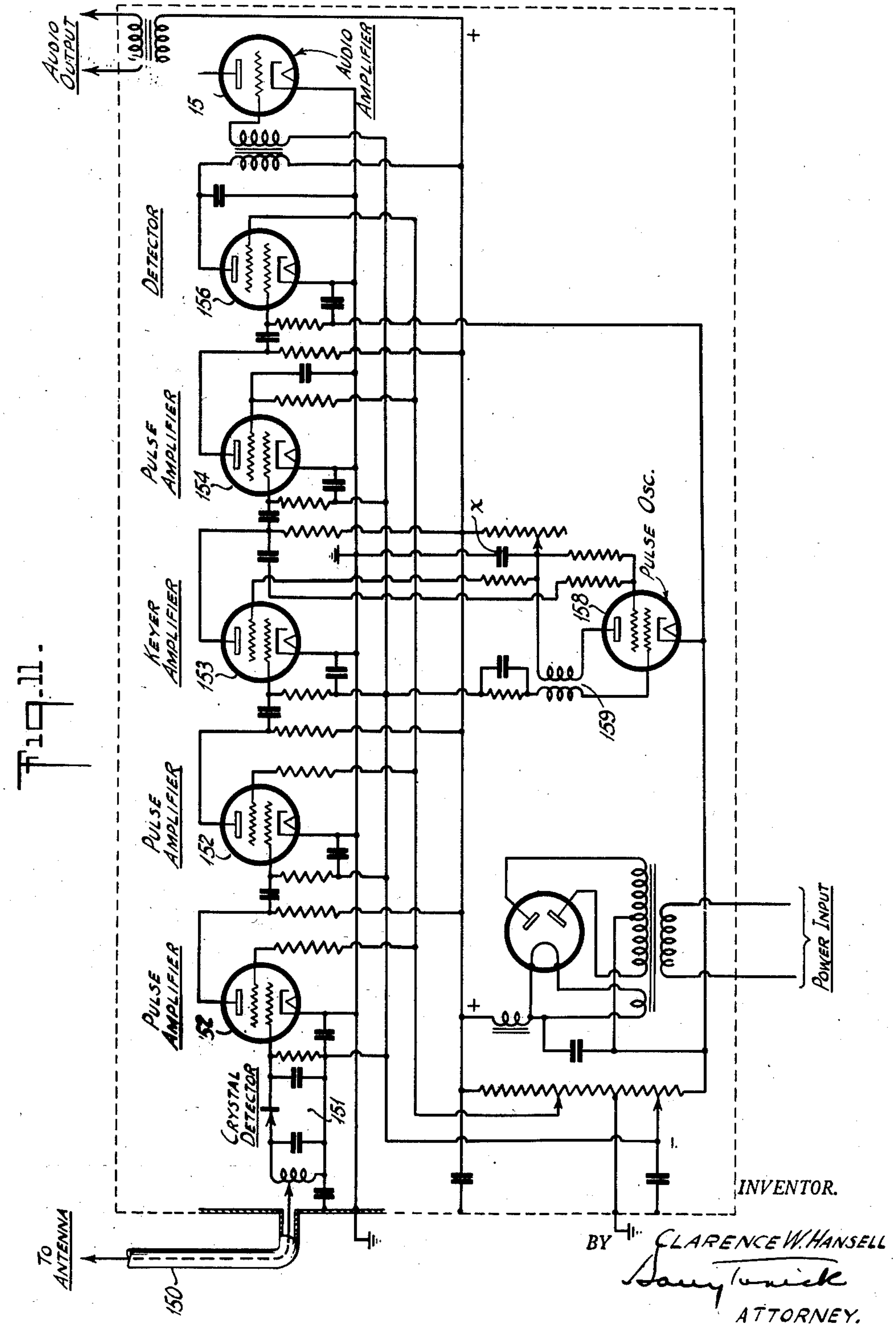
Figure 12:
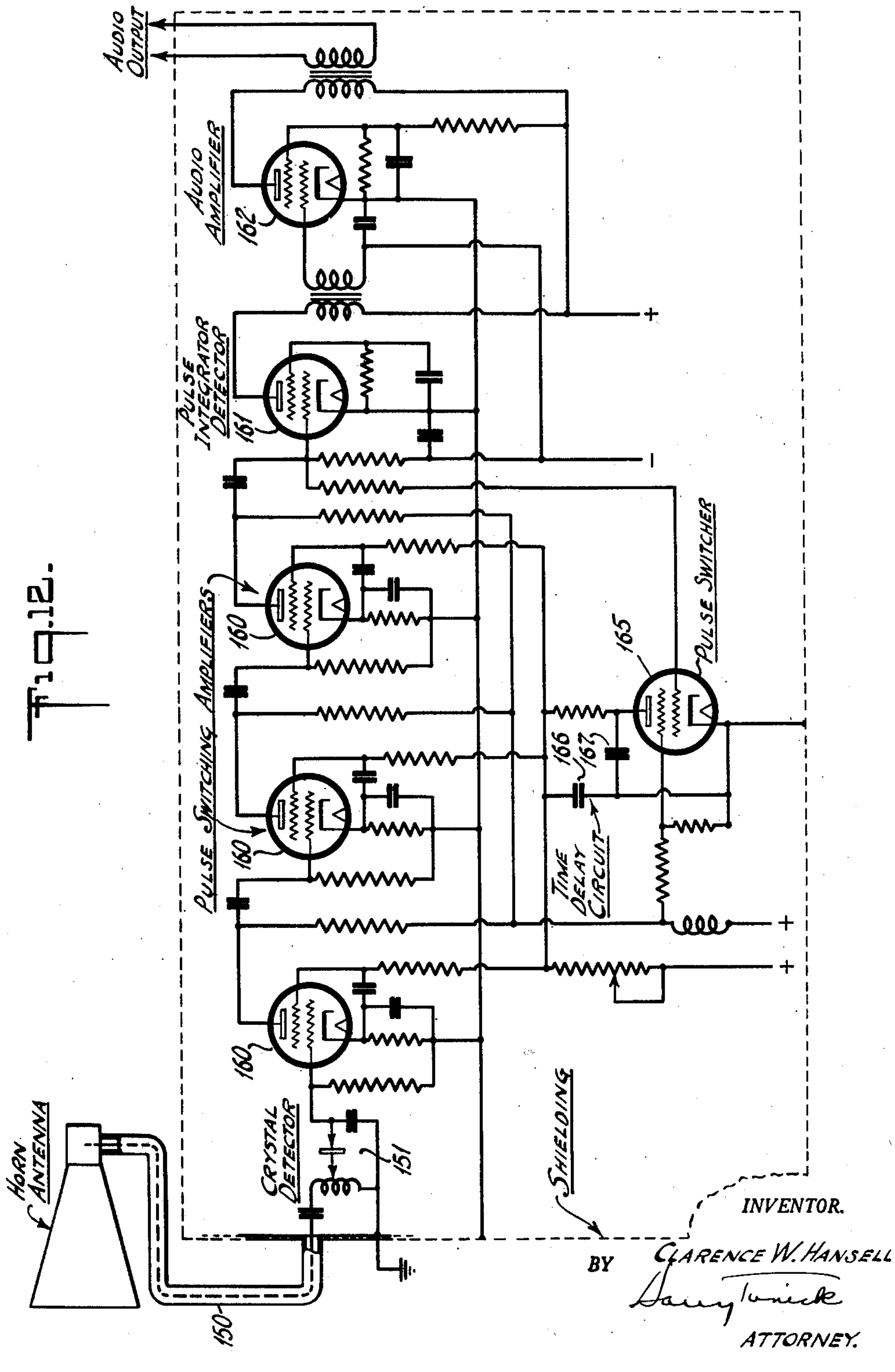

A more detailed description of the invention will now be given, in conjunction with a drawing, wherein:

Fig. 1 schematically illustrates the transmitting end of a pulse type multiplex communication system, in accordance with the present invention;

Figs. 2 to 6 schematically illustrate details of different pulse delayer circuits which can be used in the transmitting system of Fig. 1;

Figs. 7 and 8 schematically illustrate details of different types of pulse modulation circuits which can be used in the transmitting system of Fig. 1;

Fig. 9 schematically illustrates the receiving end of a pulse type multiplex communication system in accordance with the present invention;

Fig. 10 schematically illustrates the details of a pulse controlled switcher circuit which can be used in the receiving system of Fig. 8; and Figs. 11 and 12 show different embodiments of individual receivers for receiving and demodulating pulses sent out from a remote transmitter.

Referring to Fig. 1, there is shown in block diagram a pulse type multiplex transmitter suitable for the transmission of pulses which are modulated in length or timing. This transmitter includes a pulse keyed radio frequency amplifier 10 which is supplied with radio frequency excitation from a constant radio frequency oscillator 11. Transmitter 10 is provided with vacuum tube keying equipment capable of causing the transmission of very short pulses in response to short input pulses. The output from the transmitter 10 passes over a suitable transmission line 12 to an antenna system 13, here shown, by way of example only, as a directive antenna in the form of a parabolic reflector having a dipole at its focus. A pulse oscillator 14 produces pulses at a constant rate, which pulses are short compared with the time spacing between them.

These pulses are repeated at a frequency above the highest modulation frequency, and are delivered to pulse modulators 15, 16, 17, etc. and to a pulse delayer 20. The pulse modulators 15, 16 and 17 have respectively impressed thereon modulation inputs from leads 15', 16' and 17', in order that the outputs of these modulators consist of trains or groups of pulses suitably modulated in accordance with the intelligence to be conveyed on the different channels. The outputs from the pulse modulators 15, 16, 17, etc. are respectively delivered to pulse delayers and keyers 21, 22, 23, etc. These pulse delayers are adjusted for different delays in order to provide pulses which constitute the input to the transmitter or pulse keyed radio frequency amplifier 10. The pulses delivered to the transmitter 10 from the delayer circuits are preferably equally spaced in time, on the average, and recur at a pulsing rate equal to the rate of the pulse oscillator 14 multiplied by the number of pulse delayer modulators. Obviously, the pulse outputs from the different channels (each of which includes a pulse modulator and delayer circuit) are independently modulated for the transmission of independent programs or modulations.

The pulse delayer circuits 20, 21, 22, 23, etc. pass pulses at the same repetition rate as the pulse oscillator 14 but at different times. Thus, if the pulse modulator circuits modulate the length of the pulses, for example, the transmitter will send out constant frequency but variable length pulses separated in time. If, however, the pulse modulators modulate the timing of the pulses, the transmitter 10 will send out timing modulated pulses whose average frequency is the same but which are retarded or advanced in time by the modulation.

The pulses from each delayer circuit are short compared to the time intervals between them, in order that the pulses from all the channels occupy only a small percentage of the total time for all conditions of modulation. Thus, as an example, a 5 channel telephone multiplex system including a synchronizing channel might have a pulse rate in each channel of 10,000 per second, in which case the average spacing between centers of continued pulses will be 20 micro-seconds. The pulse length may be on the order of a half micro-second. For this example, it will be evident that the percentage of time occupied by all pulses in each cycle of operations for all conditions of modulation may be only 2.5% of the total elapsed time, as measured from the beginning of one pulse transmitted by the first channel to the beginning of the next pulse transmitted from the same channel in one complete cycle of operations. With this percentage of operating time the transmitter 10 can provide on the order of 40 times as much peak power as can be obtained from a continuous wave transmitter of equal size and cost.

It should be noted that the pulse oscillator 14 impresses its output directly upon the pulse delayer and keyer 20 without the intermediary of a pulse modulator circuit. This arrangement is preferred because it is desired that the pulses from the output of the pulse delayer 20 be the first ones received at the receiver, and these pulses employed to synchronize or render operative the various receiving circuits solely at those time periods when the signal pulses for the respective channels are due to arrive. In view of the slight delay occasioned in the system of the invention in rendering the receiving circuits sequentially operative after the receipt of the first pulse, it is preferred that there be no modulation impressed on the synchronizing pulses, in accordance with the preferred embodiment of the present invention. This feature will be described in more detail later in connection with the receiving system of Fig. 9.

Figs. 2, 3, 4, 5 and 6 show different types of pulse delaying circuits which can be employed in the system of Fig. 1.

Figures 2, 3:
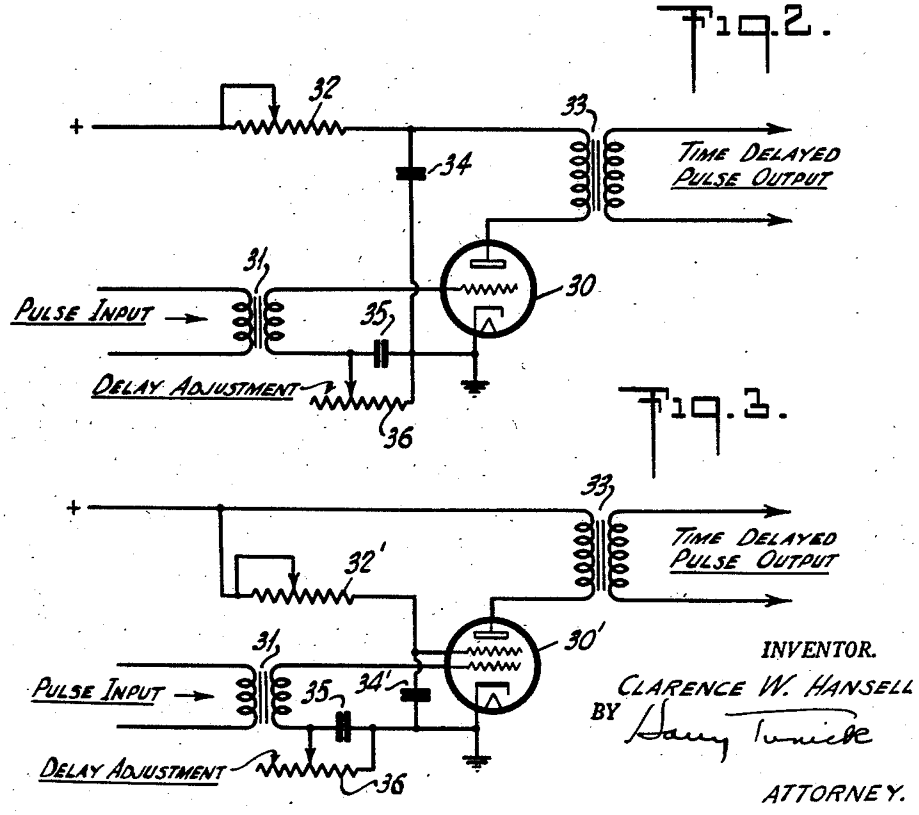

Referring to Fig. 2 in more detail, there is shown a triode vacuum tube 30 to whose grid is supplied an input pulse through a transformer 31. A positive polarizing potential is supplied to the anode of the vacuum tube through a variable resistor 32 and the primary winding of a transformer 33. A condenser 34 is connected between the cathode of the triode and the junction between the resistor 32 and the primary winding of the transformer 33. In circuit with the cathode as shown, there is provided a condenser 35 which is shunted by a resistor 36 the time constant of which circuit is a measure of the desired delay between the input pulse and the output pulse. The time delayed output pulse is taken from the secondary winding of the transformer 33. Vacuum tube 30 is so biased that it is normally conductive (that is, passes anode current in the absence of an input pulse). In this condition, a current will flow from the positive polarizing source through the resistor 32 and through the primary winding of transformer 33, thus shunting or by-passing condenser 34. An incoming pulse applied to the transformer 31 will drive the grid of the triode momentarily positive to charge the condenser 35, due to grid rectification, as a result of which a negative charge is placed on the grid of the tube 30, thus biasing the tube and rendering it non-conductive. When the tube 30 becomes non-conducting, current will flow from the positive anode polarizing source through the condenser 34 to ground, and will thus charge the condenser 34. When the charge on condenser 35 leaks off through its shunt connected resistor 36, the grid will approach a state of zero potential relative to the cathode, at which time the tube 30 will pass current, thus enabling the condenser 34 to discharge across the tube. A pulse is thus passed through the transformer 33 whose time of occurrence is controlled by the adjustment of the grid resistance 36, the latter determining the length of time it takes for the charge on condenser 35 to leak off. The rate of repetition of the pulses across the transformer 33 is, of course, determined by the repetition rate of the input pulses. The period of discharge of the condenser 35 should be less than the time spacing between the incoming pulses, to which the output pulses are responsive, and should correspond to the relative time delay desired in pulse delayer and keyer units 20, 21, 22 and 23 of Fig. 1.

Fig. 3 shows an arrangement which is similar to Fig. 2, except that the vacuum tube 30' is a screen grid tube and the condenser 34' is in the screen grid circuit. The elements which are common to Figs. 2 and 3 have been given the same reference numerals, and this applies to Fig. 4 also. Since condenser 34', resistor 32' and vacuum tube 30' of Fig. 3 respectively serve the same purpose as condenser 34, resistor 32 and vacuum tube 30 of Fig. 2, they have been given the same reference numerals except for the prime designations. Tube 30' is normally conductive and except for the structural differences hereinabove noted, the operation of Fig. 3 is substantially the same as the operation of Fig. 2.

Figure 4:
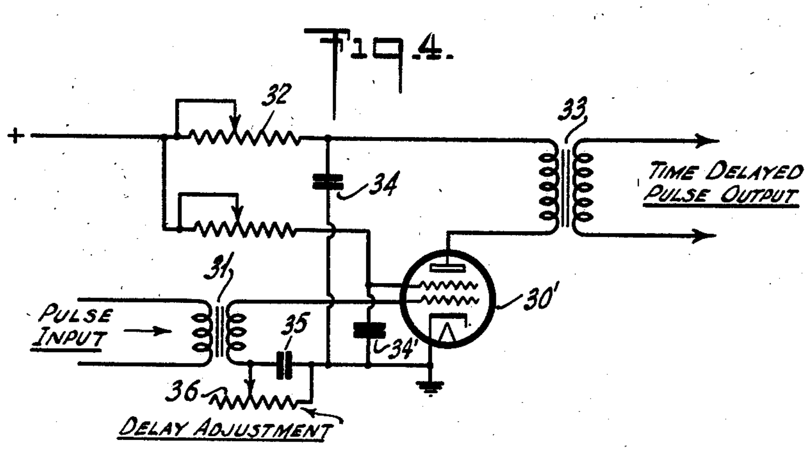

Fig. 4 is an arrangement similar to Fig. 3 with the exception that there are employed in Fig. 4 two condensers 34 and 34' which charge and discharge simultaneously, thus providing a sharper output pulse from the transformer 33. It should be noted that condensers 34 and 34' are connected to the positive polarizing potential through separate resistors 32 and 32', respectively. Except for the structural differences noted, the operation of Fig. 4 is substantially the same as that of Figs. 2 and 3.

Figure 5:
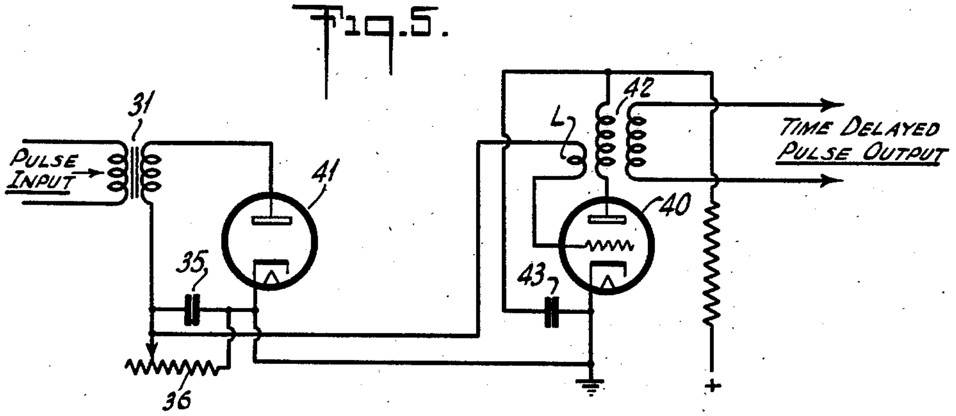

The pulse delay circuit of Fig. 5 includes a triode electrode structure 40 and a diode electrode structure 41 which, although shown in separate envelopes, may, if desired, be included within a single envelope. The triode 40 is normally conductive (that is, passes current in the absence of an input pulse applied to transformer 31). During the conductive condition of tube 40, the condenser 43 which is connected across the cathode and anode through a winding of output transformer 42, is shunted out or by-passed. The rectifier 41 passes current upon the application of an input pulse to transformer 31, as a result of which the condenser 35 will become charged and apply a negative bias to the grid of the triode 40, thus biasing the triode 40 to anode current cut-off. When triode 40 becomes nonconductive due to the negative charge on condenser 35, the condenser 43 will become charged. After the charge on condenser 35 leaks off through its shunt connected resistor 36, the triode 40 will again pass current, at which time the condenser 43 will discharge through the triode 40 and pass a pulse through the transformer 42. In order to sharpen the output pulse, a feed-back path is provided between the transformer 42 and the grid circuit by means of the winding L. Thus, when condenser 43 starts to discharge, the pulse through transformer 42 will apply a positive impulse to the grid of the triode 40, to cause the triode to pass current and discharge the condenser 43 quicker than would otherwise be possible.

Figure 6:
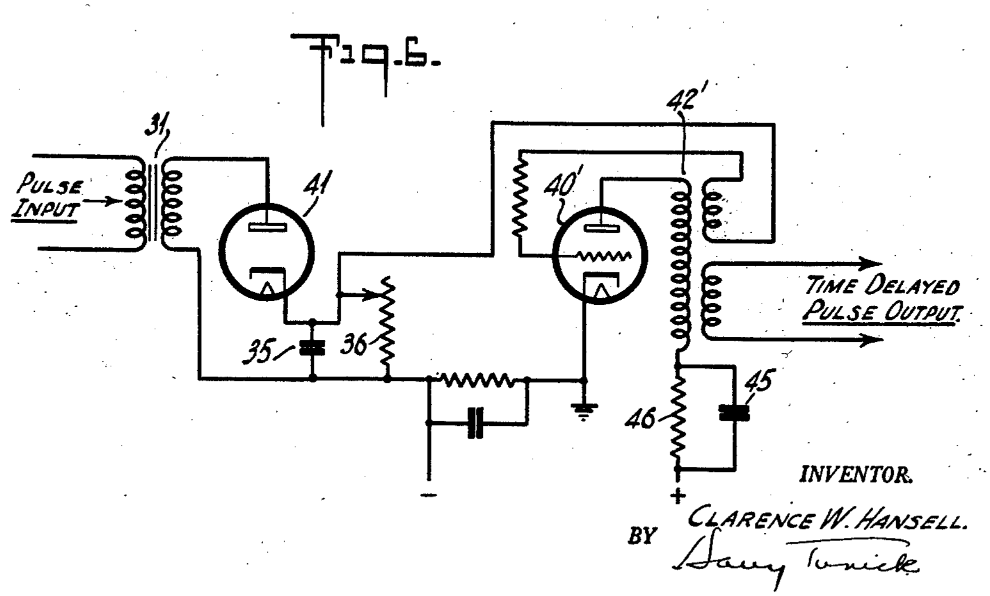

Fig. 6 shows another embodiment of a pulse delay circuit which employs a triode electrode structure 40' and a diode electrode structure 41. In Fig. 6, the triode 40' is so biased as to be normally non-conductive (that is, it passes no current in the absence of an applied pulse to transformer 31). The application of a pulse to the transformer 31 will cause a rectified current in the output of the diode 41 which will charge the condenser 35 in such manner as to apply a positive charge on the grid of triode 40' through one winding of the transformer 42'. This positive charge on the grid of the triode 40' will cause the triode to pass current until such time as the charge on condenser 35 leaks off through its shunt connected resistor 36 down to some lower value, at which time the current through the triode begins to reduce. Due to regeneration from the transformer 42' (by virtue of the feedback path shown) the triode 40' cuts itself off suddenly and passes a pulse through to the output circuit. It will thus be seen that the system of Fig. 6 works in reverse compared to the system of Fig. 5. Certain refinements shown in Fig. 6 which are not shown in Fig. 5 include the condenser 45 and resistor 46 combination in the anode circuit of the triode. The condenser 45 and the main inductance coil in the anode circuit of the triode 40' may, if desired, be adjustable for coarse time delay adjustment, whereas the adjustment of resistor 36 provides exact time delay adjustment. The resistor 46 can be replaced by a large reactance in order to save the loss of power in the circuit.

Fig. 7 shows a pulse modulation circuit which can be employed in the system of Fig. 1 for modulating the time of the pulses. This circuit of Fig. 7 includes a pulse delayer and pulse timing modulator. Referring to Fig. 7 in more detail, there is shown a triode vacuum tube 50 across whose grid and cathode are connected a circuit 51 which extends to the pulse oscillator 14 of Fig. 1, and also a modulation input circuit 52 which extends to the source of modulating potentials for impressing modulations on the pulses in accordance with the intelligence to be conveyed. The modulation input circuit 52 is connected to the grid and cathode of the triode 50 through an audio frequency transformer 53. In effect, the vacuum tube 50 is a pulse amplifier as well as a pulse modulator and a pulse limiter. The anode circuit of triode 50 includes an inductance 54 which stores energy therein, which energy is controlled by the tube anode current for delivery to the pulse delayer and pulse timing modulator vacuum tube 30'. The control grid of vacuum tube 30' is connected to the anode of the vacuum tube 50 through a condenser 56. A condenser 34 is connected between the cathode and anode of the pulse delayer 30', while a condenser 34' is connected between the screen grid and cathode of tube 30' in substantially the same manner as the same numbered elements of Fig. 4. It should be noted that the condensers 34 and 34' have individual resistors 32 and 32' connected between them and the positive anode polarizing potential. An adjustable resistor 57 is connected between the cathode and control grid of tube 30' for providing an adjustment of average pulse delay.

In the operation of Fig. 7, the triode 50 is normally conductive and stores energy in inductance 54. When a negative pulse from the oscillator 14 is applied to the circuit 51 and thence to the grid of the triode, the tube 50 will have its current cut off and cause the application of a positive pulse to the control grid of the tetrode 30'. The tetrode 30' is normally conductive in the absence of pulses. The application of a positive pulse to the control grid of the tetrode 30' will cause grid rectification which will charge condenser 56 negatively on the side adjacent the control grid of the tetrode 30'. The tube 30' is thus left in an anode current cut-off condition. During this condition, the condensers 34 and 34' charge up, and both of these condensers will discharge through the tube 30' when the negative charge on condenser 56 leaks off. The operation of vacuum tube 30', it will thus be seen, is substantially similar to the operation of Fig. 4 previously described. For modulation purposes, the input to the triode 50 through circuit 52 and transformer 43 will vary the average bias of the triode amplifier and in this manner vary the energy stored in inductance L and the strength of the pulse delivered to the tetrode, as a result of which the peak charge on condenser 56 will be varied in accordance with the modulation, thus varying the time delay of the output pulse relative to the input pulse. It should be noted that the energy stored in coil 54 is delivered to the delayer tube 30' at each pulse. The anode current in the tube 50 should, of course, reach a substantially steady state value before each pulse. If desired, there may be provided a feed-back regenerative circuit in the tetrode circuit or in a later stage to sharpen the output pulse.

The system of Fig. 8 shows a pulse modulation circuit which may be used in the system of Fig. 1 for modulating the length of the pulses. This circuit of Fig. 8, like that of Fig. 7, includes both the pulse modulator and the pulse delayer. In addition, the system of Fig. 8 includes a pulse peak limiter tube 62 which follows the pulse delayer and length modulator 30' in order to convert variable amplitude pulses from the output of the delayer tube to variable length pulses. The pulse delayer and length modulator herein represented by vacuum tube tetrode 30', with its associated elements, is substantially the same as that shown in Fig. 7. It should be noted that in Fig. 8 the pulse input circuit 51 is applied between the grid and cathode of pulse amplifier tetrode vacuum tube 60. The screen grid and cathode of tube 60 are connected together through a by-pass condenser 64, in turn shunting a portion of a potentiometer circuit 65. The modulation input circuit 52, however, is applied in Fig. 8 to a transformer 61, which is connected in such manner that the anode supply voltage of tetrode 30' is modulated in one sense while the control grid-cathode potential of tube 30' is modulated in an opposite sense for the purpose of balancing the effect of the modulation upon the time delay. I am thus able to obtain pulses of variable amplitude from the delayer tube 30', which after being limited in pulse peak limiter tube 62 appear as pulses of variable length in the output circuit 63. The pulse amplifier and limiter tube 60 is normally conductive in the absence of a negative input pulse from the oscillator 14 applied to circuit 51. The application of a negative pulse to the circuit 51 serves to cut off the anode current in tube 60 momentarily, as a result of which a positive pulse is delivered into the delayer tube 30' to produce grid rectification. The elements appearing in Fig. 8 which correspond in function to those in Fig. 7 have been given the same reference numerals.

Fig. 9 shows in block form a multiplex receiving system for use in receiving the multiplicity of short duration pulses of received energy sent out by the multiplex transmitter of Fig. 1. The receiver includes an antenna 70 which is indicative of any suitable energy collecting device which may be directive, a heterodyne detector 71 which may, if desired, be preceded by a radio frequency amplifier, which is fed with energy from the antenna 70 and also with oscillations from a local heterodyne oscillator 72, and an intermediate frequency amplifier 73 in the output of the heterodyne detector 71. The intermediate frequency amplifier 73 has its output connected over leads 74 to a pulse keyer 75, and also over leads 76 to a multiplicity of other pulse keyers 77, 78, 79, etc. The pulse keyers 77, 78, 79, etc. are associated with different communication paths or channels for receiving the different trains or groups of pulses, each of which has its own modulation. The pulse keyer 75, on the other hand, forms part of a pulse synchronizing system synchronized mainly by the end of the received pulse. This synchronization system includes not only the pulse keyer 75 but also the pulse rectifier and amplifier 91 and the pulse synchronized pulsing oscillator-amplifier 92. The output from the pulse keyer 75 supplies its output over lead 90 to the pulse rectifier and amplifier 91, the latter in turn feeding the rectified energy to a pulse synchronized pulsing oscillator and amplifier 92 from which energy is returned over leads 93 to the pulse keyer 75. This synchronization system which is described in more detail later in connection with Fig. 10, operates in synchronism with the first train of received pulses in response to the received pulses.

The different channels or communication paths in which are found the pulse keyer 77, 78 and 79 etc. are fed by pulse keying control currents over individual pulse delayer circuits 87, 88, 89, etc., the latter in turn being fed over leads 85 from the output of the pulse synchronized pulsing oscillator and amplifier 92. The pulse delayers 87, 88 and 89 etc. have different delays which are adjusted to correspond to the average time spacing of the different series of incoming pulses. The outputs from the pulse keyers 77, 78, 79 etc. are respectively passed on to pulse integrator and demodulator circuits 97, 98, 99 etc. for reproducing the signal modulation. These pulse integrators and demodulator circuits are preferably biased to provide a certain threshold value below which no signal will be passed on to the subsequent utilization circuit, as an aid in eliminating noise and interference below the threshold value. The type of pulse integrator circuit will, of course, depend upon the type of modulation on the incoming pulses. The outputs from the pulse integrator and demodulator circuits 97, 98 and 99, etc. are passed on respectively to audio amplifier and volume control circuits 107, 108 and 109, from which the audio output is utilized in any suitable audio translating device such as a headphone, loudspeaker, recorder or printer.

Briefly stated, the operation of the pulse type multiplex receiver of Fig. 9 is as follows: The extremely short pulses sent out by the transmitter of Fig. 1 and which occupy a small percentage of the total time, are received on antenna 70 and reduced in frequency in heterodyne detector 71, and amplified by intermediate frequency amplifier 73. The intermediate frequency signals from amplifier 73 pass through the pulse keyer amplifier tube 75 whose output is rectified by 91 and the rectified pulse passed on to the synchronized pulsing oscillator 92, which, in turn, interrupts the pulse keyer 75 at the frequency of the first series of received pulses. This first series of received pulses, in accordance with the preferred embodiment of the invention, is passed by the pulse delayer and keyer circuit 20 of the transmitter of Fig. 1 and thus has no modulation.

The output pulses from the pulse synchronized pulsing oscillator 92 passes through the pulse delayer circuits 87, 88 and 89 whose delays are adjusted to correspond to the time spacing of the different series of incoming pulses, each series of which represents a different channel and has its own modulation. The signals themselves, however, pass from the output of the intermediate frequency amplifier 73 to the pulse keyers 77, 78, 79 etc., whose operativeness or responsiveness is controlled by the pulse delayers 87, 88, 89 etc. It will thus be seen that the different channels in the receiver are rendered operative solely at those times when the signals are due to arrive at the different channels. Putting it in other words and using the language I have previously adopted, the different receiver channels are "shuttered" or "gated" in synchronism with the incoming pulses and the length of gate open periods for each channel are made only large enough to include the desired pulses when they are modulated. The signals passed on by the pulse keyers in the different communication paths or channels are then demodulated in the apparatus 97, 98, 99 etc., the audio output of which is then amplified in audio amplifiers 107, 108, 109.

The synchronization system in the multiplex receiver of Fig. 9, which operates in synchronism with and under control of the received pulses, is illustrated in more detail in Fig. 10, whose elements bear the same numbered reference numerals as the corresponding elements in Fig. 9. Referring to Fig. 10, it will be noted that pulses of radio frequency energy from the intermediate frequency amplifier 73 are applied between the grid and cathode of the pulse keyer 75 through a transformer 110. The pulse keyer 75 is normally biased to cut-off by virtue of a negative potential applied to the grid over a path including a resistor 121 and a secondary winding of transformer 110. The output from the pulse keyer is applied to apparatus 91 which includes a rectifier and a direct current amplifier, as shown.

It should be noted that the grid and anode circuits of the pulse keyer 75 comprise parallel tuned circuits. These tuned circuits are tuned to the intermediate frequency signal. The pulse synchronized pulsing oscillator and amplifier 92 is shown as a triode of the feed-back or regenerative type. The grid includes an inductance coil 111 which is coupled to the feed-back coil 112 in the anode circuit of the tube, both of these coils, in turn, being coupled to another coil 113 which passes positive pulses at the frequency of the pulse oscillator to the grid of the pulse keyer 75 over lead 114 and resistance 115. The oscillator 92, in effect, is a saw-tooth oscillator which normally operates by itself at a frequency slightly lower than the pulse rate of the incoming pulses, but is constrained to operate at the pulse frequency by the incoming synchronizing pulse signals. The values of the resistors and condensers either in the grid or plate circuits, or both, of the pulse oscillator 92 determine the frequency of the oscillations of the pulse oscillator 92 and these values together with the constants of the transformer in the oscillator circuit determine the length of pulses across resistance 111, which are preferably equal to, or somewhat longer than the transmitted pulses. The voltage across the anode condenser 116 and across the grid condenser 117 is a saw-tooth wave although the voltage pulse passed by coil 113 is a short pulse wave. Oscillator 92 operates continuously whether or not incoming signals arrive at the receiver. It is made relatively highly stable in operation. This type of pulsing oscillator, it will be recognized, is well known in the television art. It will be found described in my Patent #1,898,181 and in Tolson and Duncan Patent #2,101,520. In the operation of the synchronization system, the incoming pulses applied to transformer 110, which are at an intermediate frequency, will be passed by pulse keyer 75 to pass them on to the rectifier and amplifier apparatus 91 only within time intervals covered by the pulses from oscillator 92. As the time periods of signal pulses and pulses from oscillator 92 drift together until they overlap, signal pulse energy passes through keyer 75 and pulse energy is delivered through rectifier and amplifier 91 to advance the pulses of oscillator 92. The more the signal pulses overlap into the pulses from oscillator 92 the longer and stronger will be the pulses and the average D. C. current from 91 into oscillator 92 and the more oscillator 92 will be speeded up to tend to reduce the overlap. By this means, after suitable adjustments, oscillator 92 is synchronized by the signal pulses.

In this arrangement the power of energy from 91 to advance the phase and increase the frequency of oscillator 92 may be adjusted for optimum results. In addition, by employing different time constants in 91 it is possible to obtain any desired rate of response of oscillator 92 to shifts of phase between signal pulses and pulses from 92. This time constant adjustment provides an equivalent control of averaging of the synchronizing effect of signal pulses, equivalent to control of frequency selectivity for reducing the effects of noise arriving with the signals.

The connections from the pulse oscillator 92 for supplying synchronizing pulses to the pulse delayers of the multiplex receiver are also made across winding 113, each delayer being connected through a resistance like resistance 115 to minimize reactions between delayers and the synchronizing system.

Fig. 11 illustrates a single pulse receiver for receiving modulated pulses of high frequency energy transmitted from a remote pulse type transmitter. This receiver includes an antenna which is connected to the system through a transmission line 150, a detector circuit 151 which is shown as a crystal detector although it may be any suitable type of detector, a pair of pulse amplifiers 152, a keyer amplifier 153, another pulse amplifier 154, a detector 156, an audio amplifier 157, and a pulse oscillator 158 which operates in synchronism with the received pulses and controls the keyer amplifier 153.

In the operation of Fig. 11, let us assume that this receiver is designed to receive ultra high frequency pulses having a percentage duration of approximately 1% of the total time, repeated at a rate of 20,000 per second, and modulated in amplitude by speech waves at the transmitter. This 20,000 per second pulse rate is illustrative of any suitable frequency above the highest modulation frequency. These ultra high frequency pulses are received in the antenna and passed on to the crystal detector 151 over transmission line 150. The detector 151 serves to provide in its output pulses of energy with the ultra high frequency carrier removed, i. e., direct current pulses, or pulses more or less representative of the envelope of radio frequency current pulses. These pulses are then amplified in pulse amplifiers 152, 153 and 154 and demodulated in detector 156. The pulse amplifiers 152, of course, have sufficient over-all gain to acheive the desired purpose, it being understood that, if necessary, additional amplifier stages may be used. The amplifier of the receiver is keyed synchronously by the keyer amplifier 153 and passes energy on to the pulse amplifier 154 and the detector 156 only when pulses are due to arrive. The keyer 153 is operated by pulse oscillator 158 which supplies pulses at the end of the received pulses and which is synchronized by the endings of the received pulses. In effect, the pulse oscillator 158 is a saw-tooth oscillator which operates in synchronism with and is controlled by the received pulses. This oscillator 158 produces short pulses in the transformer 159 which discharge the condenser X and thereby block the pulse keyer amplifier 153, the latter in turn being arranged to receover its operating potentials, as condenser X charges up again through its charging resistance, in sufficient time for a succeeding pulse to start. Putting it in other words, it can be said that the oscillator 158 "shutters" or "gates" the amplifier 153. The pulse amplifier 154 operates on the threshold principle. Grid rectification in this amplifier 154, due to signal pulses, biases the grid potential to such a value that weak currents such as may be produced by noise, do not produce any output from the tube.

The coupling of signal pulses to oscillator 158 for accomplishing synchronizing is obtained from the screen grid current of keyer tube 153, which responds to the signal pulses, and which reacts upon oscillator 158.

Fig. 12 shows another type of receiver which may be employed instead of the receiver of Fig. 11 for receiving amplitude modulated carrier wave pulses. The receiver of Fig. 12 is an alternative to the receiver of Fig. 11 and both are equipped with the desirable feature of "shuttering" or "gating" the receiver synchronously with the transmitter, so that the receiver is operative solely at times when the signal pulses are due to arrive. In Fig. 12 the antenna is shown by way of example as a horn type of antenna for receiving ultra high frequency pulses of extremely short duration radiated by the remote transmitter. The received impulses are passed from the antenna through transmission line 150 to the detector 151 which will produce direct current pulses. The direct current pulse output from the detector 151 is passed on to three switching amplifiers 160 arranged in cascade, the output of which is passed on to a pulse integrator detector 161 which demodulates the pulses and produces audio frequency current which is then amplified in audio amplifier 162. The "gating" or "shuttering" of the receiver is effected by means of the pulse control switcher tube 165 and its associated elements. It should be noted that the control grid of tube 165 is connected to the output of the last pulse switching amplifier 160, while the screen grid circuits of the three pulse switching amplifiers 160 are connected over a common lead to the anode of the tube 165. In the operation of the receiver of Fig. 12, tube 165, in the absence of received pulses, is non-conductive. However, arrival of a signal pulse which passes through the receiver will cause tube 165 to pass current thereby discharging the condensers in its anode circuit. This reduces the screen grid potentials of amplifiers 160 and makes them inoperative for a time period which is adjustable by adjusting the value of resistance through which the condensers are charged. This time period is adjusted to correspond to the time period between the received signal pulses. Thus the receiver is blocked during time periods between signal pulses. A pulse received on the receiving system and passed by the pulse switching amplifiers places a positive potential on the control grid of tube 165, thus rendering it momentarily conductive. The momentary conductivity of tube 165 lowers the screen potential on the three pulse switching amplifier tubes 160, as a result of which the receiver is rendered inoperative until a selected time later when another pulse is due to be received. The arrangemnt of condensers 166 and 167 in circuit with the tube 165 prevents the quick lowering of the screen potentials on the pulse switching amplifiers until almost the end of the received pulse, thus allowing substantially the entire pulse to be used in producing output from the receiver. These condensers are, in effect, a time delay circuit. Putting it in other words, the keyer or switcher tube 165 serves to discharge the screen potentials of the pulse switching amplifiers 160 at each received pulse. These screen potentials, however, recover or assume their normal values before the next pulse is due to arrive.

It should be noted that tubes 160, in the absence of signal pulses, pass no current because of bias potential on their control electrodes. Therefore, pulses of the switcher 165 do not pass energy on to the pulse integrator detector in the absence of a signal pulse.

The invention claimed is:

1. A pulse delay circuit comprising an electric tube having a grid, an anode and a cathode, an input circuit connected between said grid and cathode, said input circuit including in series therewith a condenser shunted by a resistor, a transformer having a primary winding connected between said anode and the positive terminal of a source of unidirectional polarizing potential, and a secondary winding coupled to an output circuit, the constants of said circuit being such that said tube normally passes anode current in the absence of a pulse applied to said input circuit, and a condenser connected between said cathode and that terminal of said primary winding farthest away from said anode, whereby the application of a pulse to said input circuit charges said first condenser to bias said tube to cut-off, thereby permitting a charge to build up on said second condenser discharging across said tube when the charge on said first condenser leaks off, as a consequence of which an output pulse is produced in said transformer.

2. A pulse delay circuit in accordance with claim 1, including means for adjusting the effective value of said resistor for varying the time delay of the output pulse, and also an adjustable resistor located between said source of polarizing potential and said primary winding.

3. A pulse delay circuit comprising an electric tube having a cathode, a signal grid, a screen grid, and an anode, an input circuit connected between said signal grid and said cathode, said input circuit including in series therewith a condenser shunted by a resistor, a transformer having a primary winding connected between said anode and the positive terminal of a source of unidirectional polarizing potential, and a secondary winding coupled to an output circuit, the constants of said circuit being such that said tube normally passes anode current in the absence of a pulse applied to said input circuit, a condenser connected between said cathode and screen grid, and a resistive connection between said screen grid and the positive terminal of said source, whereby the application of a pulse to said input circuit charges said first condenser to bias said tube to cut-off, thereby permitting a charge to build up on said second condenser, said second condenser discharging across said tube when the charge on said first condenser leaks off, as a consequence of which an output pulse is produced in said transformer.

4. A pulse delay circuit comprising an electric tube having a cathode, a signal grid, a screen grid, and an anode, an input circuit connected between said signal grid and said cathode, said input circuit including in series therewith a condenser shunted by a resistor, a transformer having a primary winding connected between said anode and the positive terminal of a source of unidirectional polarizing potential, and a secondary winding coupled to an output circuit, the constants of said circuit being such that said tube normally pases anode current in the absence of a pulse applied to said input circuit, a condenser connected between said cathode and screen grid, and a resistive connection between said screen grid and the positive terminal of said source, another condenser connected betwen said cathode and that terminal of said primary winding farthest away from said anode, whereby the application of a pulse to said input circuit charges said first condenser to bias said tube to cut-off, thereby permitting charges to build up on both said second and third condensers, said last condensers discharging through said tube when the charge on the first condenser leaks off, as a consequence of which an output pulse is produced in said transformer.

5. A pulse delay circuit comprising an electric tube having a grid, an anode and a cathode, an input transformer having one winding connected to a source of pulses and another winding coupled between said grid and cathode, an output transformer having one winding connected between said anode and the positive terminal of a source of unidirectional polarizing potential, and a secondary winding coupled to an output circuit, the constants of said circuit being such that said tube is normally conductive in the absence of a pulse applied to said input transformer by said source of pulses, and a condenser connected between said cathode and that terminal of said primary winding farthest away from said anode, whereby the application of a pulse to said input transformer biases said tube to cut-off, thereby permitting a charge to build up on said condenser, said condenser discharging across the primary winding of said output transformer when the cut-off bias on said tube leaks off.

6. A pulse delay circuit comprising an electric tube having a grid, an anode and a cathode, an input circuit connected between said grid and cathode, said input circuit having in circuit therewith a condenser shunted by a resistor, a transformer having one winding connected between said anode and the positive terminal of a source of unidirectional polarizing potential, and another winding coupled to an output circuit, the constants of said circuit being such that said tube normally passes anode current in the absence of a pulse applied to said input circuit, and a condenser connected between said cathode and that terminal of said one winding farthest away from said anode, whereby the application of a pulse to said input circuit charges said first condenser to bias said tube to cut-off, thereby permitting a charge to build up on said second condenser, said second condenser discharging across said tube when the charge on said first condenser leaks off, as a consequence of which an output pulse is produced in said transformer.

7. A pulse delay circuit comprising an electric tube having a grid, an anode and a cathode, an input circuit connected between said grid and cathode, said input circuit having in circuit therewith a rectifier across which is a condenser shunted by a resistor, a transformer having one winding connected between said anode and the positive terminal of a source of unidirectional polarizing potential, and another winding coupled to an output circuit, the constants of said circuit being such that said tube normally passes anode current in the absence of a pulse applied to said input circuit, and a condenser connected between said cathode and that terminal of said one winding farthest away from said anode, said input circuit also including a coil coupled to said windings of said transformer to provide a feedback path to the grid, whereby the application of a pulse to said input circuit charges said first condenser to bias said tube to cut-off, thereby permitting a charge to build up on said second condenser, said second condenser discharging across said tube when the charge on said first condenser leaks off, as a consequence of which an output pulse is produced in said transformer.

8. A pulse delay circuit comprising a vacuum tube having anode, grid and cathode electrodes, a transformer having a first winding coupled between said anode and the positive terminal of a source of unidirectional potential, a second winding coupled to an output circuit, and a third winding having one terminal coupled to said grid and another terminal coupled to said cathode through a variable resistor shunted by a condenser, a rectifier coupled across said variable resistor-shunt condenser combination, and means for supplying recurrent input pulses to said rectifier.

9. A pulse delay circuit comprising a vacuum tube having anode, cathode, control grid and screen grid electrodes, a condenser between the screen grid and cathode, a direct connection from said cathode to a point of reference potential, a plurality of serially arranged impedance elements capable of passing direct current connected between said anode and screen grid, a condenser connected between said screen grid and said cathode, a circuit including a variable resistor for applying input pulses between said control grid and cathod, and an output circuit coupled to said anode for deriving time delayed pulses.

10. A pulse delay circuit in accordance with claim 9, including a transformer in the input circuit.

11. A pulse delay circuit in accordance with claim 9, characterized in that at least one of said serially arranged impedance elements is a variable resistor.

12. A pulse delay circuit arrangement including a controlled electron flow structure having at least a common electrode and an electron collecting electrode defining an electron flow path and a control electrode arranged in said structure to control the flow of electrons in said electron flow path, an output load impedance element connected to said electron collecting electrode, an electron storage capacitor coupled in series with said output load impedance element and said electron flow path and connected to said impedance element at a opint remote from said collecting electrode, a pulse input circuit comprising a shunt capacitor-resistor combination coupled between said control and said common electrodes, said circuit arrangement having constants at which the electron flow in said structure is normally of one of two predetermined conditions opposite in nature, whereby application of a pulse to said input circuit charges said shunt capacitor to alter the electron flow in said structure to charge said electron storage capacitor, the charge on said storage capacitor being discharged across said electron flow path upon the charge on said shunt capacitor being discharged through said shunt resistor, thereby producing an output pulse at said load impedance element.

13. A pulse delay circuit arrangement including an electron discharge structure having at least a cathode and an anode electrode defining an electron discharge path and a control electrode arranged in said structure to control the flow of electrons in said electron discharge path, an output load impedance element connected to said anode electrode, an electron storage capacitor coupled in series with said output load impedance element and said electron discharge path and connected to said impedance element at a point remote from said anode electrode, a pulse input circuit comprising a shunt capacitor-resistor combination coupled between said control and said cathode electrodes, said circuit arrangement having constants at which the electron flow in said structure is normally of one of two predetermined conditions opposite in nature, whereby application of a pulse to said input circuit charges said shunt capacitor to alter the electron flow in said structure to charge said electron storage capacitor, the charge on said storage capacitor being discharged across said electron discharge path upon the charge on said shunt capacitor being discharged through said shunt resistor, thereby producing an output pulse at said load impedance element.

14. A pulse delay circuit arrangement including a controlled electron flow structure having at least a common electrode and an electron collecting electrode defining an electron flow path and a control electrode arranged in said structure to control the flow of electrons in said electron path, an output load impedance element connected to said electron collecting electrode, an electron storage capacitor coupled in series with said output load impedance element and said electron flow path and connected to said impedance element at a point remote from said collecting electrode, a pulse input circuit comprising a shunt capacitor-resistor combination coupled between said control and said common electrodes, said circuit arrangement having constants at which electrons flow in said structure, whereby application of a pulse to said input circuit charges said shunt capacitor to block the electron flow in said structure to charge said electron storage capacitor, the charge on said storage capacitor being discharged across said electron flow path upon the charge on said shunt capacitor being discharged through said shunt resistor, thereby producing an output pulse at said load impedance element.

15. A pulse delay circuit arrangement including an electron discharge device having at least cathode, control and anode electrodes defining an electron discharge path having a control electrode arranged therein to control the flow of electrons in said electron discharge path, an output load impedance element connected to said anode electrode, an electron storage capacitor coupled in series with said output load impedance element and said electron discharge path and connected to said impedance element at a point remote from said anode electrode, a pulse input circuit comprising a shunt capacitor-resistor combination coupled between said control and said cathode electrodes, said circuit arrangement having constants at which electrons normally flow in said device in the absence of pulses in said input circuit, whereby application of a pulse to said input circuit charges said shunt capacitor to block the electron flow in said device to charge said electron storage capacitor, the charge on said storage capacitor being discharged across said electron discharge path upon the charge on said shunt capacitor being discharged through said shunt resistor, thereby producing an output pulse at said load impedance element.

16. A pulse delay circuit arrangement including an electron discharge system having at least a cathode and an anode defining an electron discharge path and a control grid and a screen grid interposed therebetween to control the flow of electrons in said electron discharge path, an output load impedance element connected to said anode, a resistance element and an electron storage capacitor coupled in series with said output load impedance element and said electron discharge path and connected to said impedance element at a point remote from said anode, said screening grid being connected to the junction between said capacitor and said resistance element, a pulse input circuit comprising a shunt capacitor-resistor combination coupled between said control grid and said cathode, said circuit arrangement having constants at which said electron discharge system normally passes current in the absence of pulses in said input circuit, whereby application of a pulse to said input circuit charges said shunt capacitor to alter the electron discharge in said system to charge said electron storage capacitor, the charge on said storage capacitor being discharged across said electron discharge path upon the charge on said shunt capacitor being discharged through said shunt resistor, thereby producing an output pulse at said load impedance element.

17. A pulse delay circuit arrangement including an electron discharge system having at least a cathode and an anode defining an electron discharge path and a control grid and a screen grid interposed therebetween to control the flow of electrons in said electron discharge path, an output load impedance element connected to said anode, a source of unidirectional operating potential, said cathode being connected to the negative terminal of said source of operating potential, an electron storage capacitor coupled in series with said output load impedance element and said electron discharge path and connected to said impedance element at a point remote from said anode, an auxiliary storage capacitor and a resistance element coupled in series between said cathode and the positive terminal of said source of operating potential, said screening grid being connected to the junction between said auxiliary capacitor and said resistance element, a pulse input circuit comprising a shunt capacitor-resistor combination coupled between said control grid and said cathode, said circuit arrangement having constants at which said electron discharge system normally passes current in the absence of pulses in said input circuit, whereby application of a pulse to said input circuit charges said shunt capacitor to alter the electron discharge in said system to charge said electron storage capacitor, the charge on said storage capacitor being discharged across said electron discharge path upon the charge on said shunt capacitor being discharged through said shunt resistor, thereby producing an output pulse at said load impedance element.

18. A pulse delay circuit arrangement including a controllable electron flow structure having at least an electron emitting electrode and an electron collecting electrode defining an electron flow path and an electron flow control electrode interposed therebetween to control the flow of electrons in said electron flow path, a shunt network comprising a capacitor and a resistor connected in parallel, a direct current path from one end of said network to the electron emitting electrode of said electron flow structure, direct current connections between the other terminal of said network and the control electrode of said electron flow structure, a pulse input circuit coupled to said network to charge said capacitor, a pulse output impedance element connected to the electron collecting electrode of said electron flow structure, said circuit arrangement having constants at which the electron flow in said structure is normally of one of two predetermined conditions opposite in nature and upon application of a pulse to said network the charge on said capacitor is effective to reverse the condition of electron flow in said structure, at least one reactive circuit component coupled between the electron emitting and electron flow control electrode circuit and the electron collecting electrode circuit to cause a pulse of current to flow in said pulse output impedance element upon the discharge of said capacitor and the reinstatement of said one condition of electron flow in said structure, thereby producing an output pulse at the output impedance element delayed in time with respect to the application of a pulse to said input circuit.

19. A pulse delay circuit arrangement including a controllable electron flow structure having at least an electron emitting electrode and an electron collecting electrode defining an electron flow path and an electron flow control electrode interposed therebetween to control the flow of electrons in said electron flow path, a shunt network comprising a capacitor and a variable resistor connected in parallel, a direct current path from one end of said network to the electron emitting electrode of said electron flow structure, direct current connections between the other terminal of said network and the control electrode of said electron flow structure, a pulse input transformer having a secondary winding thereof coupled to said network to pass a pulse of current through said network to charge said capacitor, a pulse output transformer having a primary winding with one terminal thereof connected to the electron collecting electrode of said electron flow structure and the other terminal connected to a source of polarizing potential, said circuit arrangement having constants at which the electron flow in said structure is normally of one of two predetermined conditions opposite in nature and upon application of a pulse to said network the charge on said capacitor is effective to reverse the condition of electron flow in said structure, at least one reactive circuit component coupled between the electron emitting and electron flow control electrode circuit and the electron collecting electrode circuit to cause a pulse of current to flow in said pulse output transformer winding upon the discharge of said capacitor and the reinstatement of said one condition of electron flow in said structure, thereby producing an output pulse at the output transformer delayed in time with respect to the application of a pulse to said input transformer.

20. A pulse delay circuit arrangement including a controllable electron flow structure having at least an electron emitting electrode and an electron collecting electrode defining an electron flow path and an electron flow control electrode interposed therebetween to control the flow of electrons in said electron flow path, a shunt network comprising a capacitor and a resistor connected in parallel, a direct current path from one end of said network to the electron emitting electrode of said electron flow structure, direct current connections between the other terminal of said network and the control electrode of said electron flow structure, a pulse input circuit, a diode element coupling said pulse input circuit across said network to charge said capacitor upon application of a pulse to said input circuit, a pulse output transformer having a primary winding connected to the electron collecting electrode of said electron flow structure and a secondary winding connected between said electron flow control electrode and the other end of said network, said circuit arrangement having constants at which the electron flow in said structure is normally blocked and upon application of a pulse to said network the charge on said capacitor is effective to effect electron flow in said structure to cause a pulse of current to flow in said pulse output transformer primary winding upon the discharge of said capacitor and the blocking of electron flow in said structure, thereby producing an output pulse at the output transformer delayed in time with respect to the application of a pulse to said input circuit.

21. A pulse delay circuit arrangement including a controllable electron flow structure having at least an electron emitting electrode and an electron collecting electrode defining an electron flow path and an electron flow control electrode interposed therebetween to control the flow of electrons in said electron flow path, a shunt network comprising a capacitor and a variable resistor connected in parallel, a resistive path from one end of said network to the electron emitting electrode of said electron flow structure, a rectifier, a pulse input transformer having a secondary winding thereof coupled in series with said rectifier across said network to charge said capacitor on application of a pulse to said input transformer, a pulse output transformer having a primary winding with one terminal thereof connected to the electron collecting electrode of said electron flow structure and a secondary winding connected in regenerative polarity, a parallel resistor-capacitor combination connected between the other terminal of said primary winding and a source of polarizing potential, said circuit arrangement having constants at which the electron flow in said structure is normally blocked and upon application of a pulse to said network the charge on said capacitor is effective to effect electron flow in said structure to cause a pulse of current to flow in said pulse output transformer primary winding upon the discharge of said capacitor and the reblocking of electron flow in said structure, thereby producing an output pulse at the output transformer primary winding delayed in time with respect to the application of a pulse to said input transformer.

22. A pulse delay circuit arrangement including a controllable electron flow structure having at least an electron emitting electrode and an electron collecting electrode defining an electron flow path and an electron flow control electrode and a screen electrode interposed therebetween to control the flow of electrons in said electron flow path, a shunt network comprising a capacitor and a variable resistor connected in parallel and having one end connected to the electron emitting electrode of said electron flow structure, a pulse input transformer having a secondary winding thereof coupled between the other terminal of said network and the control electrode of said electron flow structure to charge said capacitor upon application of a pulse to said input transformer, a pulse output transformer having a winding with one terminal thereof connected to the electron collecting electrode of said electron flow structure and the other terminal connected to a source of polarizing potential, said circuit arrangement having constants at which the electron flow in said structure is normally conducting and upon application of a pulse to said network the charge on said capacitor is effective to block the electron flow in said structure, a storage capacitor coupling the electron emitting and screen electrodes, an adjustable resistor coupling the screen electrode to the electron collecting electrode circuit at a point beyond the winding of said output transformer said storage capacitor being charged when said electron flow is blocked and discharged across said electron flow structure upon the discharge of said capacitor across said variable resistor to reinstate said electron flow in said structure to cause a pulse of current to flow through said pulse output transformer winding, thereby producing an output pulse at the output transformer delayed in time with respect to the application of a pulse to said input transformer.

23. A pulse delay circuit including a controlled electron flow system having at least two electrodes defining an electron flow path the first one of said electrodes being an output electrode, and the second being connected to a point of fixed potential and a third electrode associated with said two electrodes to control the flow of electrons in said path, an output load impedance element connected to said output electrode, a storage capacitor coupled in series circuit relationship with said load impedance element and said electron flow path, a pulse input circuit having a series capacitor therein coupled between said third electrode and said point of fixed reference potential, said circuit having constants at which the electron flow in said system is of one nature, whereby the application of a pulse to said input circuit renders the electron flow of opposite nature to charge said storage capacitor and said series capacitor, said storage capacitor discharging over said electron path when the charge on said series capacitor leaks off thereby producing an output pulse at said load impedance element.

24. A pulse delay circuit comprising a vacuum tube having an anode, a cathode, a signal grid and a further grid, a capacitor connected between the further grid and the cathode, a direct connection from said cathode to a point of reference potential, a pair of serially arranged impedances capable of passing direct current connected between said anode and a source of unidirectional potential, a capacitor connected between the junction point of said pair of impedances and said cathode, a circuit including a series capacitor and a resistor in shunt thereto for applying input pulses between said control grid and cathode, and an output circuit coupled to said anode for deriving time delayed pulses.

CLARENCE W. HANSELL.

References Cited in the file of this patent

UNITED STATES PATENTS

| Number | Name | Date |
|---|---|---|
| 1,573,983 | Mathes | Feb. 23, 1926 |
| 2,313,906 | Wendt | Mar. 16, 1943 |
| 2,403,561 | Smith | July 9, 1946 |
| 2,418,375 | Tourshou | Apr. 1, 1947 |
| 2,451,997 | Undy | Oct. 19, 1948 |
| 2,478,920 | Hansell | Aug. 16, 1949 |